United States Patent

[11] 3,610,663

| [72] | Inventor | Ernest T. Lago<br>Jackson, Mich. |
|---|---|---|
| [21] | Appl. No. | 29,908 |
| [22] | Filed | Apr. 20, 1970 |
| [45] | Patented | Oct. 5, 1971 |
| [73] | Assignee | Aesoquip Corporation<br>Jackson, Mich. |

[54] BRAZED CONNECTION
23 Claims, 5 Drawing Figs.

[52] U.S. Cl. .................................................. 285/4,
29/503, 228/56, 285/21, 285/286, 285/294
[51] Int. Cl. .................................................. F16l 35/00
[50] Field of Search .................................. 29/503;
228/56; 285/3, 4, 21, 286, 287, 294, 297

[56] References Cited
UNITED STATES PATENTS

| 2,084,207 | 6/1937 | Lindquist et al. ............... | 285/287 X |
| 2,055,885 | 9/1936 | Weston .......................... | 285/294 |

FOREIGN PATENTS

| 963,910 | 7/1964 | Great Britain ................ | 285/297 |

*Primary Examiner*—Dave W. Arola
*Attorney*—Jerry K. Harness

ABSTRACT: A system for brazing a tube end to a collar. The collar has a slightly flared interior surface which receives the tube, the end of which engages a shoulder. The edge of the collar is then rolled down against the tube to form a closed brazing pocket. A cartridge is mounted on the collar, the cartridge having brazing material and a propellant which becomes gaseous at approximately the same temperature as the brazing material. The propellant forces the brazing material into the shallow pocket where it forms a brazed connection between the collar and tube. As shown, the collar connects two tubes inserted from opposite ends.

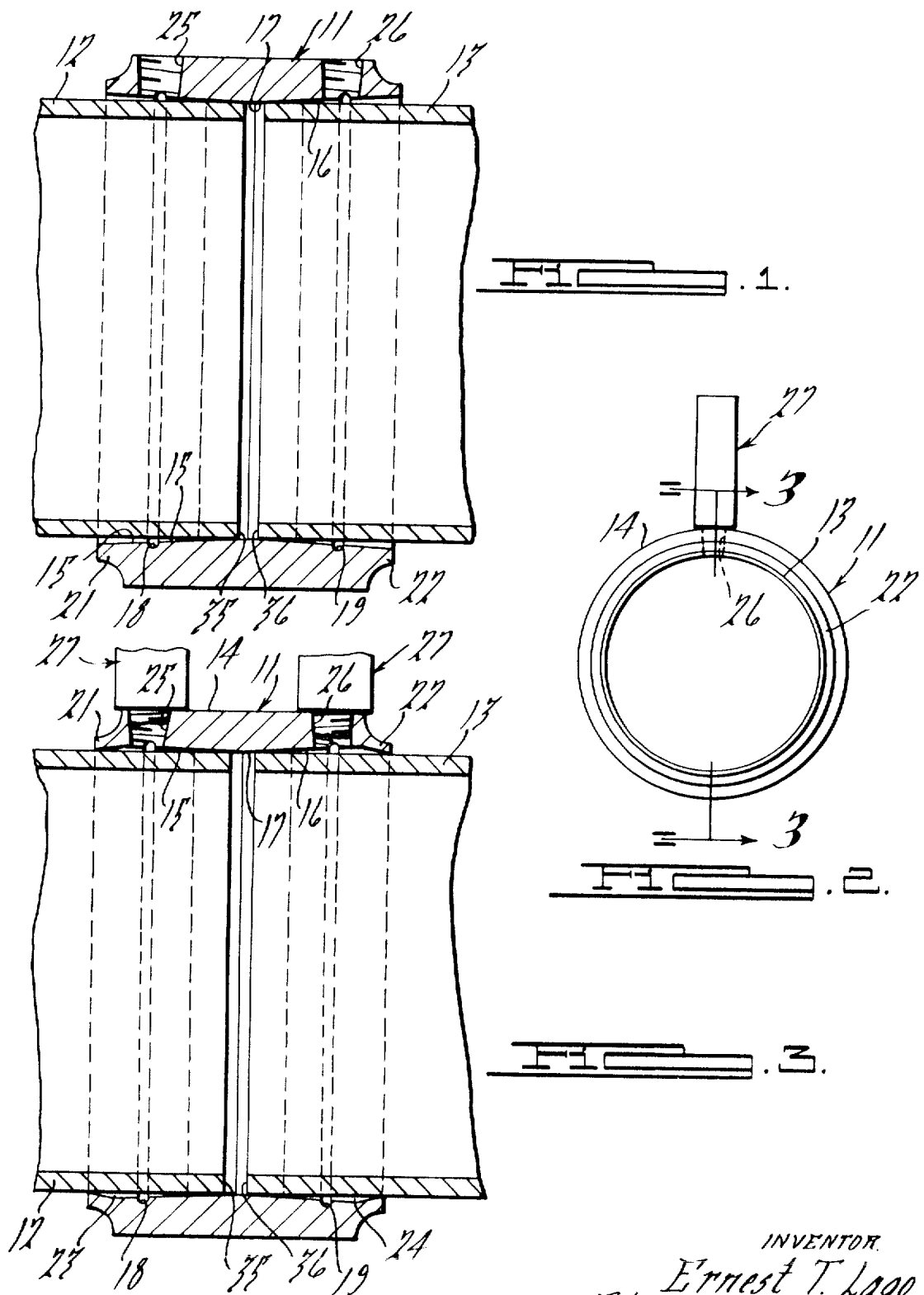

INVENTOR.
Ernest T. Lago.
BY
his ATTORNEY

BRAZED CONNECTION

BACKGROUND OF THE INVENTION

Field of the Invention

The invention relates to brazed connections between tubes and fittings, wherein a brazing material flows into an annular cavity between the parts. The invention has particular application for on-the-site brazing where access is limited, heat being applied by any conventional type of heating unit such as an induction or resistance heater. However, the invention is also useful in other brazing applications where it is important that a good joint be obtained with the braze material filling practically all of the joint.

Description of the Prior Art

Aside from the usual type of brazed joint in which the braze material is applied manually from the outside while the joint is being heated, it is known to provide joints in which the collar has an annular reservoir groove in which a brazing ring is placed. The tube is inserted in the collar and through this ring, after which the joint is heated to cause the alloy to flow into the annular capillary gaps on either side of the reservoir. Another known type of brazing system utilizes a wire feed system, in which a brazing wire reel is located at the edge of the collar, the wire being fed off the reel toward the joint. In none of these known systems is the brazing material pressurized while entering the joint cavity. For this and other reasons, difficulty in filling the joint is sometimes encountered in such conventional types of brazing systems.

BRIEF SUMMARY OF THE INVENTION

In its broadest aspect, the invention comprises a collar having a slightly enlarged interior into which the tube may be inserted with clearance until it engages a stop portion. As illustrated, the collar has two such enlarged portions so that the ends of two tubes may be joined. After insertion of the tube, the edge of the collar is bent down against the tube exterior, thus forming a closed annular chamber between the tube and collar. A cartridge is attached to the collar, this cartridge containing the braze material as well as a propellant charge such as a flux which becomes gaseous at approximately the same temperature as the braze material. A cup-shaped piston separates the propellant and brazing material so that upon heating of the joint, the expanding propellant will cause the piston to force the melted brazing material into the cavity between the tube and collar. As illustrated, the cartridge has a tapered screw connection to a radial passage in the collar, and after the brazing material has solidified, the cartridge may be snapped off at the base of the thread. The system has been found consistently to fill practically all of the cavity, thus forming a satisfactory brazed connection.

BRIEF DESCRIPTION OF THE DRAWINGS

FIG. 1 is a cross-sectional view in elevation of a joint incorporating the principles of the invention, shown before the collar edges are turned down;

FIG. 2 is an end view of the joint showing the cartridges mounted in the collar;

FIG. 3 is a view similar to FIG. 1 but showing the cartridges in place and with the collar edges turned down, this view being taken along the line 3—3 of FIG. 2;

DESCRIPTION OF THE PREFERRED EMBODIMENT

Figure 4:
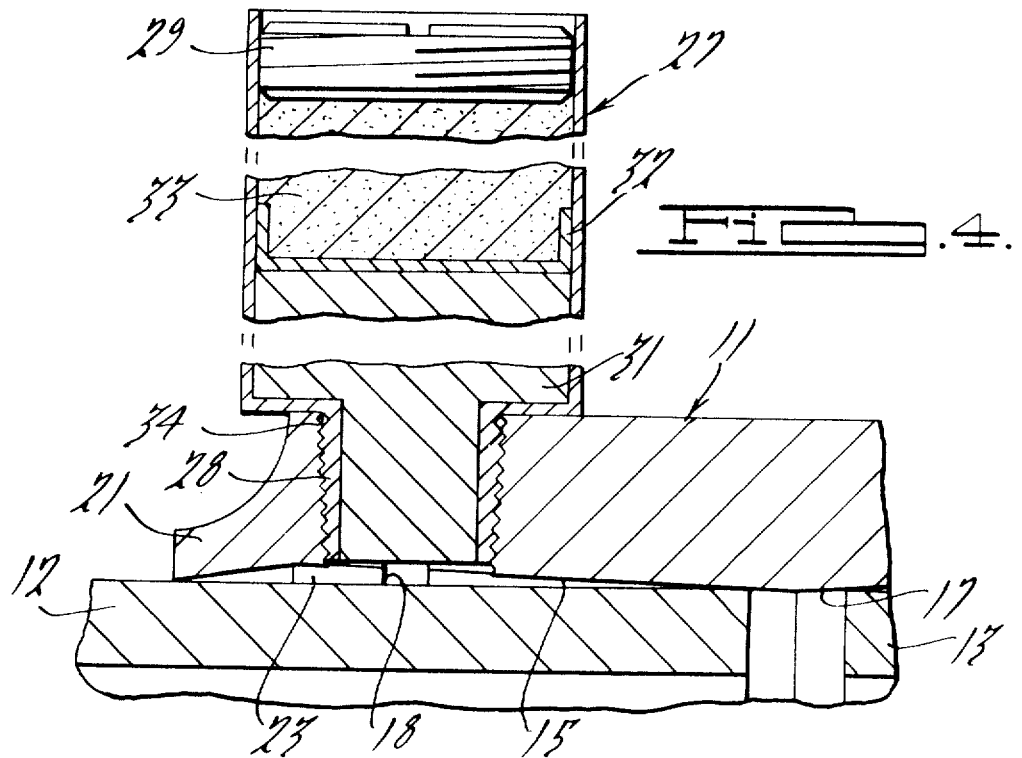
FIG. 4 is an enlarged fragmentary cross-sectional view, parts being broken away, showing the interior of the cartridge and its connection to the collar cavity.
Figure 5:
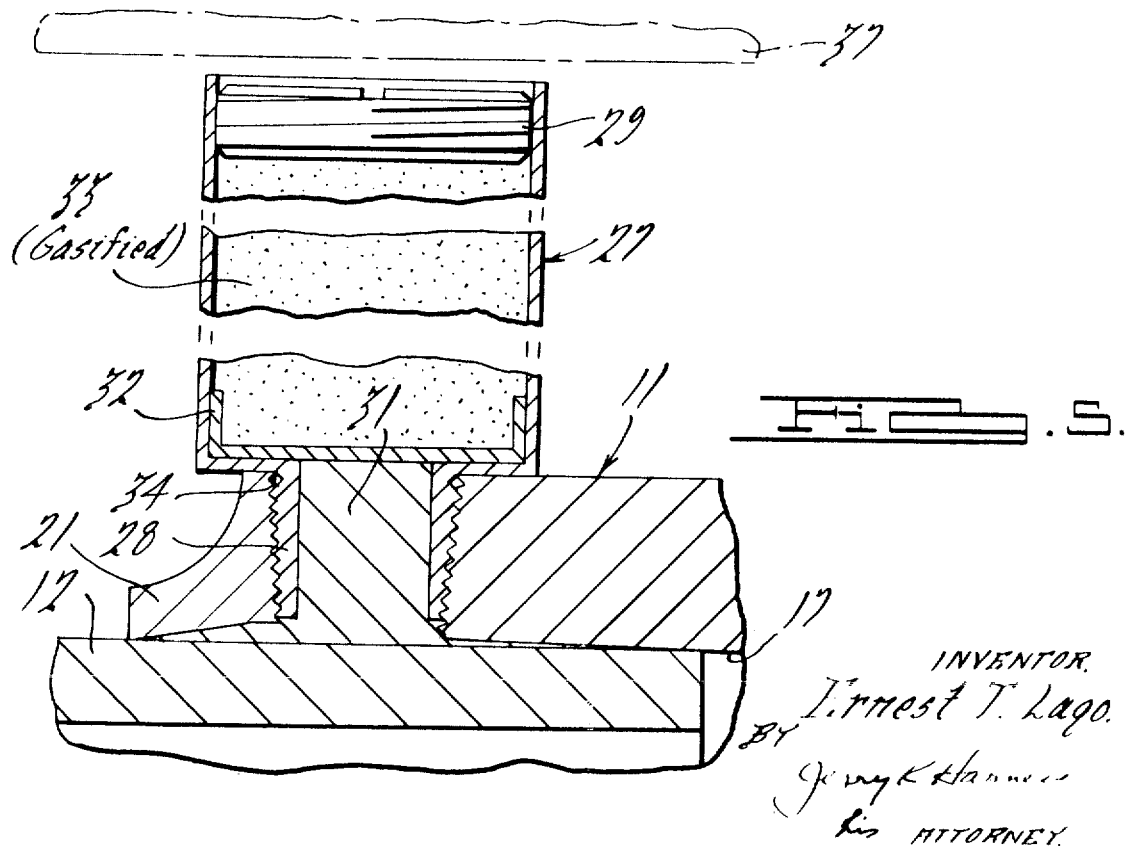
FIG. 5 is a view similar to FIG. 4 but showing the heater in position and illustrating the flow of brazing material which forms the joint after the cartridge propellant has expanded.

The collar is generally indicated at 11 and is shown as connecting the ends of two tubes 12 and 13. Collar 11 has a cylindrical outer surface 14, the interior surface having a pair of oppositely extending slightly flared portions 15 and 16. A typical angle for this flare is about 2°. The central portion 17 of the collar interior is slightly less in diameter than the outer diameter of tubes 12 and 13, so that when the latter are inserted therein, they will engage shoulder 17 as a stop to limit their inward movement. A pair of annular grooves 18 and 19 are formed in the interior surface of collar 11 for purposes which will hereinafter appear.

The opposite edges 21 and 22 of collar 11 are narrowed, and in use, these edges will be bent down over tubes 12 and 13 after they have been inserted in the collar, so as to form closed chambers 23 and 24 between the collar and tubes.

A pair of tapered threaded passages 25 and 26 extend radially from the exterior of collar 11 to cavities 23 and 24, respectively. Instead of only one passage extending to each cavity, a plurality of circumferentially spaced threaded passages may be provided, depending on the amount of brazing material required. A cartridge generally indicated at 27 is screwed into each passage 25 or 26. This cartridge is of cylindrical shape, having an externally threaded nozzle 28 inserted into passage 25 or 26, and a cap 29 threaded into the opposite end. A brazing material 31 fills a portion of each cartridge 27, the brazing material filling nozzle 28 as well. A cup-shaped piston 32 is disposed in cartridge 27 above brazing material 31, and a propellant 33 fills the space between piston 32 and cap 29. This propellant could be a conventional type of brazing flux or other substance which gasifies at about the same or a slightly higher temperature than the brazing material, for example around 1,200° F. Piston 32 is so constructed that it will tend to expand against cartridge 27 in response to gasification of the propellant, thus increasing the sealing effect. The base of nozzle 28 is provided with an annular groove 34 to facilitate breaking off of the cartridge after the braze has been completed, as will be described below.

In operation, tubes 12 and 13 will be inserted in collar 11 until their ends 48 and 49, respectively, engage shoulder 17. Edges 21 and 22 of the collar will then be bent down against the tubes to form chambers 23 and 24. Cartridges 27 will be screwed into passages 25 and 26 and the joint will be presented to the heating device. Upon heating, the braze material 31 in cartridges 27 will melt at or slightly before the time that propellant 33 is gasified to drive piston 32 inwardly against the melted brazing material. The braze alloy will flow through nozzles 28 and around grooves 18 and 19 into chambers 23 and 24, filling these chambers to form the brazed connection.

After the braze metal has cooled, cartridges 27 may be snapped off at grooves 34, nozzles 28 and the braze alloy which they contain remaining with collar 11.

What is claimed is:

1. In a brazed joint construction, a collar for receiving a tube end, a shoulder within said collar which the tube end engages, the outer edge of said collar being bendable against the tube to form an annular chamber between the tube and collar, and a cartridge mounted on said collar communicating with said chamber and containing a braze material and a propellant which gasifies at approximately the melting point of the braze material, whereby the propellant will force the braze material into said chamber when said braze material is heated to its melting point.

2. The combination according to claim 1, further provided with an annular groove in said chamber for conducting the braze material around the chamber.

3. The combination according to claim 1, the interior wall of said collar having a slight outward flare to form said chamber.

4. The combination according to claim 3, further provided with an annular groove in said collar for conducting the braze material around said chamber.

5. The combination according to claim 3, the bendable outer edge of said collar being of reduced diameter.

6. The combination according to claim 1, said cartridge having a nozzle threadable into a radial passage in said collar.

7. The combination according to claim 6, said passage and thread being tapered.

8. The combination according to claim 6, the base of said nozzle having a groove, whereby the cartridge may be snapped off after the braze metal is solidified.

9. The combination according to claim 1, said cartridge being further provided with a piston between said propellant and braze material.

10. The combination according to claim 9, said piston being cup shaped so as to be pressed against the cartridge wall in response to propellant pressure to maintain a seal.

11. The combination according to claim 10, the interior of said collar being slightly flared from said shoulder to said bendable edge to provide said chamber, and an annular groove in said interior collar wall to conduct braze metal around said chamber.

12. In a coupling for connecting two tubes, a collar receiving tube ends from opposite sides, the outer edges of said collar being bendable against said tubes to form annular chambers between the tubes and the collar, and cartridge means mounted on said collar and communicating with said chambers, each cartridge having brazing material and a propellant therein, said propellant being responsive when sufficient heat is applied to the coupling to melt said brazing material to propel the melted brazing material into said chambers.

13. The combination according to claim 12, said collar having a central shoulder which the tube ends engage when inserted from opposite ends of the collar.

14. The combination according to claim 13, the outer edges of said collar being of reduced diameter to permit said bending.

15. The combination according to claim 13, the interior of said collar being slightly flared from said shoulder to said outer edges to provide said chambers.

16. The combination according to claim 15, the outer edges of said collar being of reduced diameter to permit said bending.

17. The combination according to claim 16, further provided with annular grooves in the interior collar wall to permit brazing material to flow around said chambers.

18. The combination according to claim 12, said cartridge means comprising at least two cartridges threadably mounted in radial passages of said collar by means of nozzles extending therefrom.

19. The combination according to claim 18, the bases of said nozzles being provided with grooves whereby said cartridges may be snapped off after the brazing material is solidified.

20. The combination according to claim 12, said propellant comprising a brazing flux gasifiable at approximately the melting temperature of said brazing material.

21. The combination according to claim 20, further provided with a piston in said cartridge between said brazing material and propellant.

22. The combination according to claim 21, said piston being cup shaped so as to respond to the propellant pressure to create a sealing affect.

23. The combination according to claim 21, said collar interior wall having slightly flared portions extending from said shoulder to said outer edges, and annular grooves in said chambers to conduct brazing material therearound.